United States Patent [19]

McMurtry

[11] Patent Number: 5,029,399
[45] Date of Patent: Jul. 9, 1991

[54] PROBE FOR USE WITH MEASURING APPARATUS

[75] Inventor: David R. McMurtry, Wotton-Under-Edge, United Kingdom

[73] Assignee: Renishaw plc, Gloucestershire, United Kingdom

[21] Appl. No.: 460,888

[22] PCT Filed: Jul. 10, 1989

[86] PCT No.: PCT/GB89/00786

§ 371 Date: Feb. 13, 1990

§ 102(e) Date: Feb. 13, 1990

[87] PCT Pub. No.: WO90/00716

PCT Pub. Date: Jan. 25, 1990

[30] Foreign Application Priority Data

Jul. 8, 1988 [GB] United Kingdom ............... 8816358

[51] Int. Cl.[5] .............................................. G01B 7/28
[52] U.S. Cl. ........................................ 33/559; 33/556; 33/558; 33/561
[58] Field of Search ................. 33/559, 561, 556, 558, 33/551, 557, 558.01, 560, 572

[56] References Cited

U.S. PATENT DOCUMENTS

| 4,535,543 | 8/1985 | Linder | 33/559 |
|---|---|---|---|
| 4,553,332 | 11/1985 | Golinelli et al. | 33/561 |
| 4,562,646 | 1/1986 | Dall'Aglio | 33/559 |
| 4,734,994 | 4/1988 | Cusack | 33/561 |
| 4,916,825 | 4/1990 | Breyer | 33/561 |
| 4,934,065 | 6/1990 | Hajdukiewicz et al. | 33/561 |
| 4,964,223 | 10/1990 | Linder et al. | 353/561 |

FOREIGN PATENT DOCUMENTS

| 0103856 | 9/1983 | European Pat. Off. |
| 0146697 | 3/1985 | European Pat. Off. |
| 0303831 | 7/1988 | European Pat. Off. |
| 2620099 | 2/1976 | Fed. Rep. of Germany. |
| 3234851 | 3/1984 | Fed. Rep. of Germany. |
| 2121966 | 1/1984 | United Kingdom. |

OTHER PUBLICATIONS

Dynamic Acquisition and Automatic Reduction of Data, p. 288, 6/1978.

Primary Examiner—William A. Cuchlinski, Jr.
Assistant Examiner—William C. Dowling
Attorney, Agent, or Firm—Oliff & Berridge

[57] ABSTRACT

A hinge probe is described (see FIG. 1) in which a plurality of plates (4,10,45,46,47) are stacked in the direction of the probe axis (11). The plates are connected together in pairs by hinge means (12,50,52 and 53), various forms of which are described, which define pivot axes and which constrain each pair of plates for relative pivoting movement about a side edge of the pair. The pivot axes are arranged to be mutually orthogonal to enable tilting of a stylus (2), attached to one of the plates (4), in any direction by pivoting of one or more of the plates when a force is applied to the stylus. An axial rest position for each movable plate on an adjacent plate is defined in combination with the hinge by a further support (14,16) disposed between each pair of plates on the opposite side of the probe axis (11) to the respective pivot axis. A spring (17) urges the plates into their respective rest positions. Constraint against relative transverse movements of the plates of a pair is provided in addition to that provided by the hinge, if any, by a planar spring (20), or other devices. Thus the hinge can be made quite flexible while maintaining an accurate rest position for the stylus to which it returns when any tilting force has been removed, and the force required to remove the stylus from its rest position is minimized.

11 Claims, 3 Drawing Sheets

PROBE FOR USE WITH MEASURING APPARATUS

The present invention relates to probes for use in measuring apparatus and in particular relates to dynamic probes for use with measuring machines and machine tools.

It is known from U.S. Pat. No. 4,535,543 for such a probe to take the form of a stack of plates with defined tilting axes in x and y co-ordinate directions. The plate at one end of the stack is connected to the body of the probe, and a probe feeler or stylus is connected to the plate at the opposite end of the stack with its longitudinal axis orthogonal to the plane of the plate to which it is connected. The plates are interconnected in pairs along the tilting axes by leaf springs, and are supported one upon another. Additional springs are provided between the plates of each pair to provide a force in the direction of the longitudinal axis of the stylus to urge the plates into a rest position. The plates may be displaced from the rest position by a tilting or lifting action by a force applied to the free end of the stylus when the stylus contacts a workpiece.

Such probes are inherently liable to potential inaccuracy. For example, if the leaf springs are made too resilient they may bend or twist under the force applied to the stylus in the sense of allowing movement of the stylus transverse to the axis. However, if they are made stiff enough to prevent such bending or twisting they will provide resistance to the force provided by the additional springs, and may under some circumstances prevent the rest position being attained.

The present invention provides an improved probe for use with measuring apparatus. According to the present invention there is provided a probe for use with measuring apparatus, the probe having an axis and comprising:

a plurality of members spaced apart in the direction of said probe axis and including a fixed member, a movable member to which a stylus is connectable and at least one further member, hinge means connecting the members together in pairs and constraining the members of each pair for relative pivoting movement about a pivot axis which extends in a plane at right angles to said probe axis, the pivot axis of each pair being laterally offset from said probe axis.

support means for each pair of members disposed in the plane of the pivot axis of the pair on the opposite side of said probe axis to the pivot axis, said support means co-operating with the respective hinge means to define an axial rest position for one member of the pair on the other when no external force acts on the probe stylus, resilient means for urging said one member of the pair into said rest position on the other member, constraining means for preventing relative transverse movements between the two members of a pair.

The fixed member may be, or may be connected to, a fixed part of the probe e.g. a probe housing.

There may be a plurality of said further members each of which, along with the movable member, is pivotable relative to another of the members. In this way a stylus connected to the movable member may be made both tiltable about a plurality of pivot axes extending in two mutually orthogonal directions at right angles to the probe axis in the same or different planes, and movable in at least one direction along the axis of the probe, when an external force is applied to it, for example when it contacts a workpiece during a measuring operation.

In a preferred form of the invention there are provided a plurality of members in the form of flat plates each supported one upon another and each having at least one side edge, the plates being interconnected in pairs with said side edges in mutually parallel relationship, and each pair being capable of relative pivoting movement about a pivot axis adjacent to said side edges of the pair and perpendicular to the probe axis. The number and arrangement of the plates is such that four pivot axes are provided, two of which extend parallel to a first direction and two of which extend in a second direction perpendicular to the first direction.

Preferably signalling means are provided on the probe, or on a machine to which the probe is connected for measurement purposes to provide an indication as to when the stylus contacts a workpiece to be measured.

Alternatively, the workpiece may form part of an electrical circuit through the probe and the machine which is completed when the stylus touches the workpiece to provide an electrical signal.

The signalling means may take any convenient form, many of which are already known per se in the measuring probe art. For example, the pivoting of the various members may be detected, either electrically, optically, pneumatically or by any other suitable means.

In preferred forms of the invention the contact of the stylus with the workpiece may be detected by a piezoelectric device, or by a piezo-resistive element or other strain-gauge connected to the stylus or the probe.

One form of hinge means permitting pivoting of a member in each respective pair relative to the other member comprises a leaf spring extending along said side edges and connected to both members. The leaf spring may itself define the pivot axis for each pair of members. In this arrangement the leaf spring co-operates with the support means on the opposite side of the axis of the probe to define the axial rest position of the pivoting member on the other member of the pair.

The resilient means provided to urge one member of a pair into its rest position on the other means may comprise individual springs between each pair of members, or a single spring or other device reacting against fixed structure to urge the whole stack of members axially into their respective rest positions.

The hinge means may take various forms other than the leaf springs described above. For example, a pair of aligned vee-grooves in each of which a rolling element such as a ball or roller is seated may be used to define the pivot axis. In such an embodiment an additional axial constraint is required to be provided by the hinge means to ensure that the balls do not lose contact with the seats whereby the pivoting action is maintained. Such additional constraint may comprise a resilient connection between the plates, for example a C-spring.

The constraining means may take various forms to prevent relative movement of the members in a pair, transverse to the probe axis.

The simplest form of constraint would comprise simple abutment means on each plate in a pair which contact each other at all times to prevent such movement. Two such abutments are required on each pair of members positioned so as to prevent relative transverse movements due to relative rotation of the members about the axis of the probe as well relative translational movements in the direction of or orthogonal to the pivot axis.

One preferred form of constraining means is a planar spring which is connected between the two members of a pair and which extends in the plane of the pivot axis to provide rigidity to counter transverse movement in said plane.

Part of the constraining means may be provided by the support means whereby the support means is capable of providing one or more of the transverse constraints.

At least part of the constraining means may however be provided by the hinge means. For example, each leaf spring provides resistance to relative translational movements between the members of a pair in the direction of the pivot axis. Where the hinge means comprises a pair of aligned vee-grooves to define the pivot axis, the vee-grooves provide constraint against translational movements between the members of a pair in the direction normal to the pivot axis. In these cases the constraining means needs to provide, in addition to any constraint provided by the hinge means, constraint against relative rotation of the members and translational movements in the orthogonal direction not constrained by the hinge means. Other designs of hinge means may inherently provide more or less constraint against relative transverse movement of the two members of a pair.

Examples of the invention will now be more particularly described with reference to the accompanying drawings in which.

Figure 1:
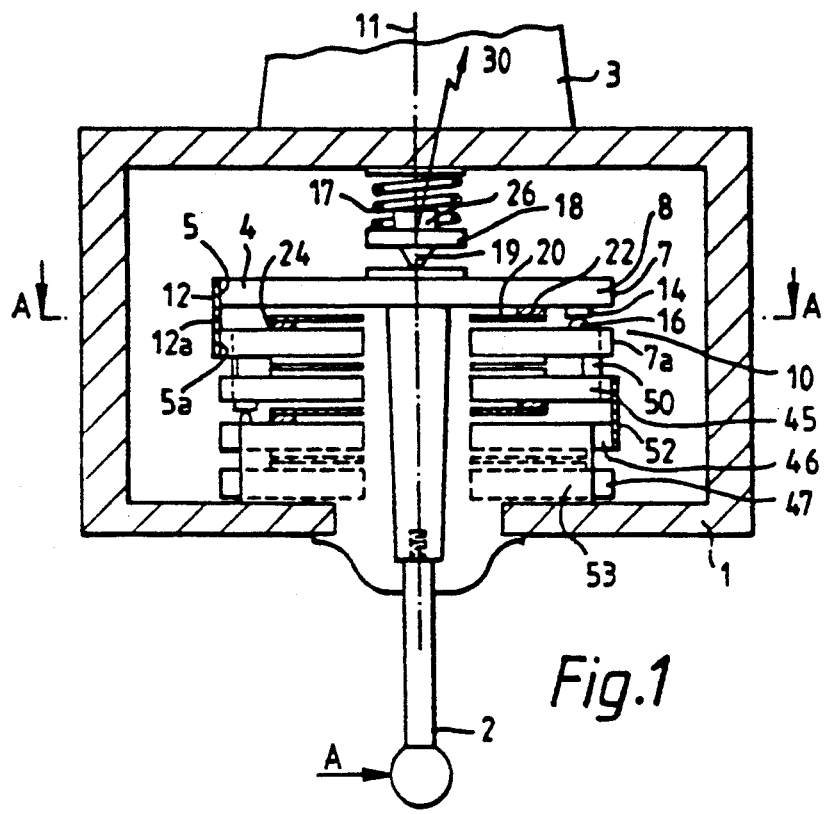
FIG. 1 is sectional elevation through a measuring probe which illustrates the principle of the invention.
Figure 2:
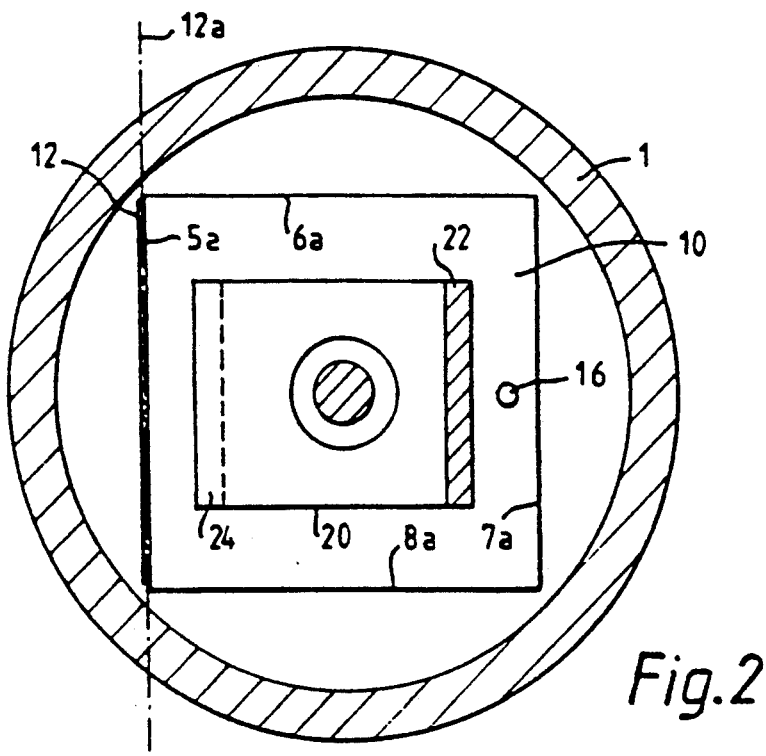
FIG. 2 is a sectional plan view on the line A—A of FIG. 1.
Figure 3:
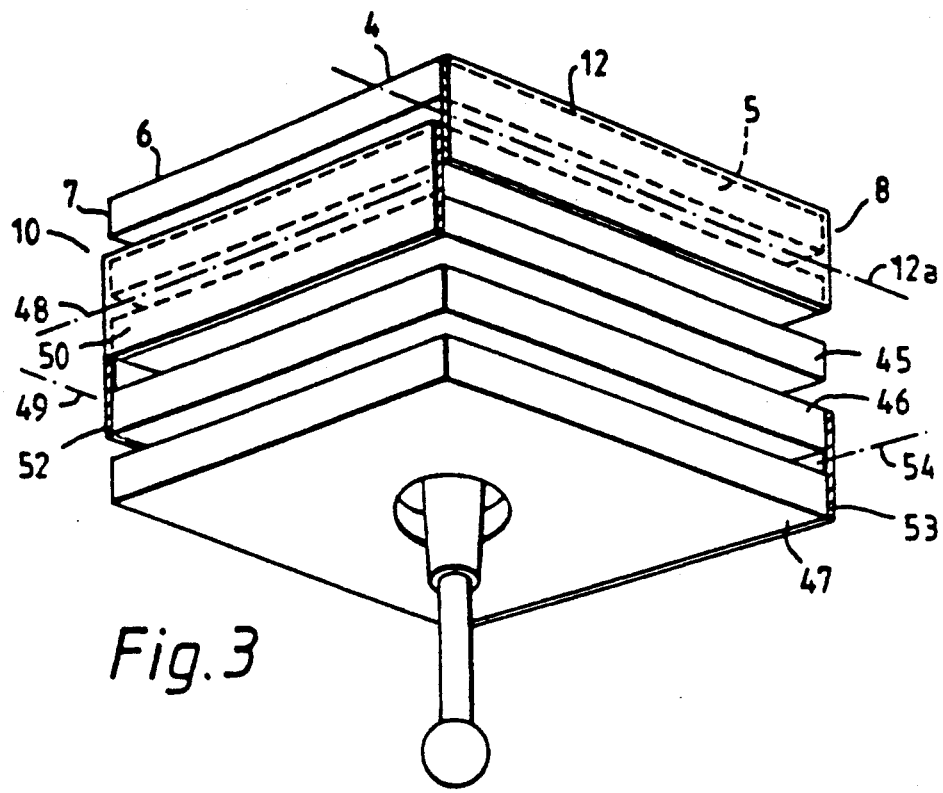
FIG. 3 is a perspective view of the probe of FIG. 1.

Referring now to FIGS. 1 to 3 of the drawings there is shown a probe having a housing 1 from which projects a feeler or stylus 2 which, when in use on a measuring apparatus (which may be a measuring machine or machine tool) is brought into contact with a workpiece surface to register the position of the surface. A shank 3 is provided on the probe to enable the probe to be attached to the apparatus.

As will be described below, the probe generates a signal when the stylus contacts the workpiece, and also allows for tilting of the stylus in any direction, and axial movement of the stylus in at least one direction to avoid damage to the probe when the stylus contacts a workpiece and a force is thereby exerted on the stylus. The signal is transmitted to the machine in any one of a number of known ways to cause the x, y, z co-ordinate measuring devices of the machine to be interrogated in known manner to obtain a reading indicative of the point on the workpiece surface at which contact by the stylus is made. The stylus 2 is connected within the probe housing 1 to a movable member 4 shown in this example as a square plate having four orthogonal side edges 5, 6, 7 and 8.

The movable member or plate 4 is supported on a further member in the form of a plate 10 which constitutes part of a mounting means by which the stylus is mounted within the probe housing for tilting movement and axial movement relative to the housing when a force is applied to the tip of the stylus as the stylus contacts a workpiece. The complete mounting means constitutes a stack of five square plates 4, 10, 45, 46 and 47 all interconnected as described below to allow tilting of the stylus in both directions along the x and y coordinate axes of the machine. The plate 47 is connected to the housing 1 and constitutes a fixed member.

To illustrate the operation of the invention the movable member or plate 4 will be considered only in relation to the adjacent plate 10 which may be considered as a fixed member upon which the movable member or plate 4 is supported for relative pivoting motion.

The plate 10 is also square and has four side edges 5a, 6a, 7a and 8a. The plate 10 and the plate 4 are arranged one above the other in spaced relationship in the direction of the probe axis 11 and with their respective side edges in mutually parallel relationship.

The plate 4 and the plate 10 are interconnected along their respective side edges 5 and 5a to form a pair, by a hinge in the form of a leaf spring 12 which defines a pivot axis 12a about which the plate 4 can pivot on the plate 10 when a force acts on the stylus in the direction of the arrow A.

The leaf spring 12 prevents separation of the two plates in the direction of the probe axis thus constraining the plate 4 to pivot on plate 10. Support means in the form of simple abutments for example a pad 14 on the plate 4 and a confronting ball 16 on the plate 10, is provided on the opposite side of the probe axis to the pivot axis 12a. The support means is disposed in the plane of the pivot axis and co-operates with the hinge 12 to define an axial rest position of the plate 4 on the plate 10.

Resilient means is provided in the form of a spring 17 which presses down on the plate 4 via a plate 18 and a cone 19 to urge the plate 4 into engagement with plate 10 at the support means 14, 16.

Constraining means is provided in the form of a planar spring 20 which is of generally rectangular shape and which is connected to the plate 4 and the plate 10 at abutment faces 22, 24 thereon respectively.

Signalling means is provided in the form of a piezo-electric element 26 attached on one side only to the plate 18, and which generates an electrical signal when the stylus engages a workpiece. The electrical signal is passed to a machine (not shown) on which the probe is mounted via conductors indicated at 30.

It can be seen therefore that the planar spring 20 being flexible in the axial direction but stiff transversely to the probe axis 11 prevents any relative transverse movement between the plate 4 and the plate 10, effectively preventing relative translational movements of the plates or relative rotational movements of the plates about the probe axis 11.

With this arrangement the hinge 12 may be made resilient enough to avoid the possibility of it overriding the action of the spring 17 and preventing the axial rest position from being attained. The hinge 12 may also be sufficiently flexible to provide no significant transverse constraint. The planar spring acting as lateral constraint in co-operation with the hinge and the supports, ensures that in addition to the axial rest position, the movable member and hence the stylus 2 has an overall rest position to which it will return with great accuracy after displacement of the stylus in the direction of the arrow A ceases. Although the hinge 12 in the form of a leaf spring is intended to be flexible it may contribute to the provision of the constraint against relative translational movements of the plates in the direction of the pivot axis 12a and hence forms a part of the constraining means.

It can be seen that the complete probe includes a stack of five plates 4, 10, 45, 46 and 47 one on top of the other. The top plate 4 comprises the movable member to which the stylus 2 is connectable and, the plate 10 to which it is tiltably connected is considered to be a fixed member with respect to relative movement between the plate 4 and 10.

However, in an exactly similar arrangement all of the plates 4, 10, 45 and 46 are mounted tiltably one upon another, the last plate 47 being part of, or being attached to the housing.

In the example illustrated in FIGS. 1 to 3 it can be seen that the plate 10 is supported on the lower plate 45 and is mounted for tilting relative thereto about a tilting axis 48 defined by hinge means constituted by a leaf spring 50 disposed at right angles to the leaf spring 12. Thus, for this pair of plates 10, 45, the plate 45 may be considered to be the fixed member, and the movable member 4, to which the stylus is connectable, also includes plate 10. The pair of plates 10, 45 are axially separated to allow a planar spring to be used to provide transverse constraint as previously described. Support means in the form of a further pad and ball (not shown) are provided on the opposite side of the probe axis to the leaf spring 50 and this support means in conjunction with the leaf spring 50 defines an axial rest position for the plate 10 on plate 45. The same spring 17 may act as resilient means for this plate pair 10, 45, or alternatively separate springs may be provided between the plates to urge the plate 10 into the rest position on plate 45.

Similarly, plate 45 is tiltable about a further tilting axis 49 defined by hinge means constituted by a leaf spring 52 at right angles to axis 48 on plate 46 of the stack. In this case the movable member to which the stylus is connectable constitutes plate 4 in combination with plates 10 and 45, and plate 46 may be considered to be the fixed member in relation thereto.

The constraining means, resilient means and support means and the definition of the rest position of plate 46 on plate 45 are as described above.

Finally, plate 46 is mounted for tilting on plate 47 about a tilting axis 54 by hinge means constituted by a leaf spring 53. In this case plate 47 constitutes the fixed member and may in fact be part of, or attached to, the housing of the probe. The movable member to which the stylus is connectable constitutes plate 4 in combination with plate 10, 45 and 46.

It can be seen that with a probe constructed in this manner the stylus can tilt in all four x, y co-ordinate axes of a machine to which it is attached and will also move from its overall rest position if a vertically upward force is applied to the stylus. The addition of a transverse constraint as described in accordance with the invention improves the accuracy of the probe. It is to be noted that all of the tilting axes should be arranged to be equi-distant from the probe axis, so that the forces required on the stylus to cause tilting about the four axes are the same.

Figure 4:
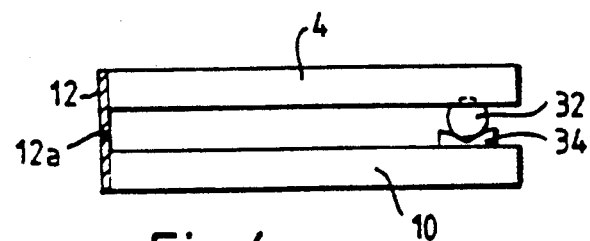
FIG. 4 is a part sectional elevation through part of a probe illustrating an alternative embodiment of the invention.

FIG. 4 shows an alternative configuration in which the movable member 4 and the plate 10 are interconnected in similar manner by a hinge in the form of a leaf spring 12, but wherein the support means and the constraining means are combined in the form of a ball 32 seated in a conical recess 34. It can be seen that not only will the ball and conical recess provide an axial support but they will constrain relative translational movements between the two members, and relative rotational movements between them about the probe axis 11. The remaining parts of this embodiment are not shown since they may be the same as are described in relation to the embodiment of FIGS. 1 to 3.

Figure 5A:
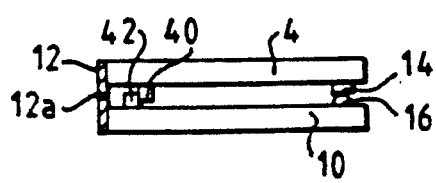
FIGS. 5a and 5b show respectively a part sectional elevation and a plan view of part of a probe showing a further alternative embodiment of the invention.
Figure 5B:
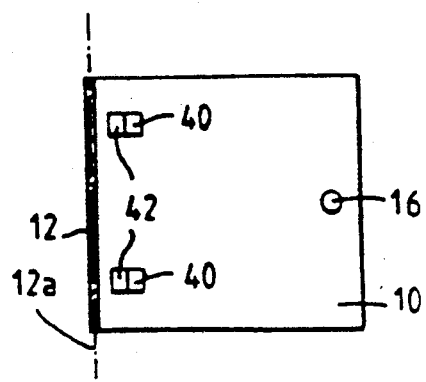

FIGS. 5a and 5b show a further alternative embodiment in which transverse movement between the plate 10 and the movable member 4 is prevented by constraining means in the form of abutments 40 and 42 on the movable member 4 and the plate 10 respectively. Two pairs of abutments 40, 42 are provided to ensure that relative rotation of the two plates about the axis of the probe is constrained as well as translational movements normal to the pivot axis 12a.

Figure 6:
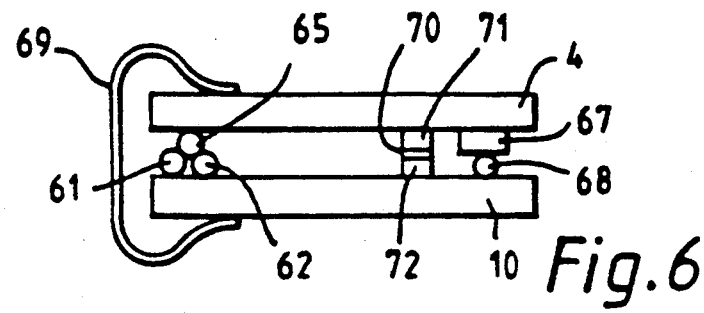
FIG. 6 is a part sectional elevation through part of a probe showing a further embodiment of the invention.
Figure 7:
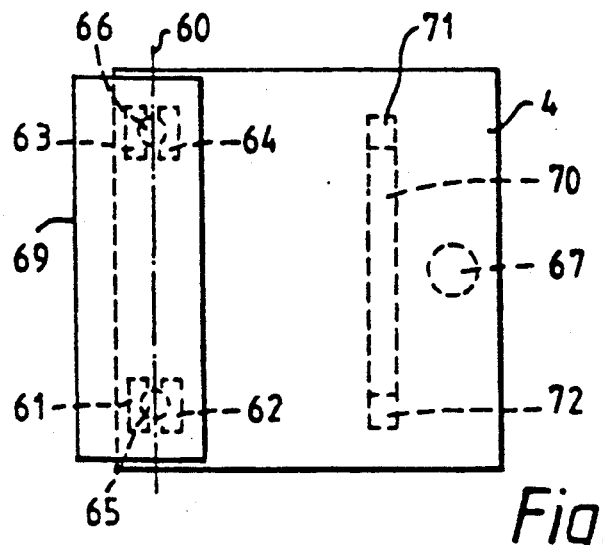
FIG. 7 is a plan view of the part of the probe illustrated in FIG. 6.

In a further embodiment illustrated in FIGS. 6 and 7 the plate pairs (only one of which is shown) are pivotably mounted one upon another, and the pivot axis 60 is defined by two pairs of rollers 61, 62 and 63, 64 which form two transversely separated aligned vee-grooves on which rest rolling elements in the form of balls 65 and 66. A C-spring 69 applies an axial clamping force between the two plates to maintain the balls 65 and 66 in contact with the vee-grooves and to ensure that plate 4 pivots relative to plate 1C at the pivot axis 60. The vee-grooves and balls together with the C-spring constitute the hinge means. Additional support means are provided on the opposite side of the probe axis to the pivot axis 60 in the form of a pad 67 on plate 4 and a ball 68 on plate 10. The hinge means and the additional support define the axial rest position of the plate 4 on the plate 10. The spring 69 may constitute the sole resilient means urging plate 4 into its axial rest position on plate 10 thus replacing spring 17, or it may simply form part of the resilient means in combination with spring 17 or some additional spring (not shown).

The vee-grooves provide lateral constraint to prevent relative movement of the plate normal to the tilting axis 60 and relative rotation about the probe axis. Further lateral constraint is required in the direction of the tilting axis. This constraint is provided in the form of an elongate planar spring 70 connected between abutments 71 and 72 respectively on plates 4 and 10. The spring 70 must be sufficiently flexible in the plane normal to the tilting axis so that it does not provide a constraint against movement in that plane which will compete with the balls and vee-groves 61, 62, 63 and 64. In this embodiment it can be seen that the constraining means includes the hinge. It is to be understood that the balls 65 and 66 may be replaced by other rolling elements in the form of rollers in the vee-grooves.

Figure 8:
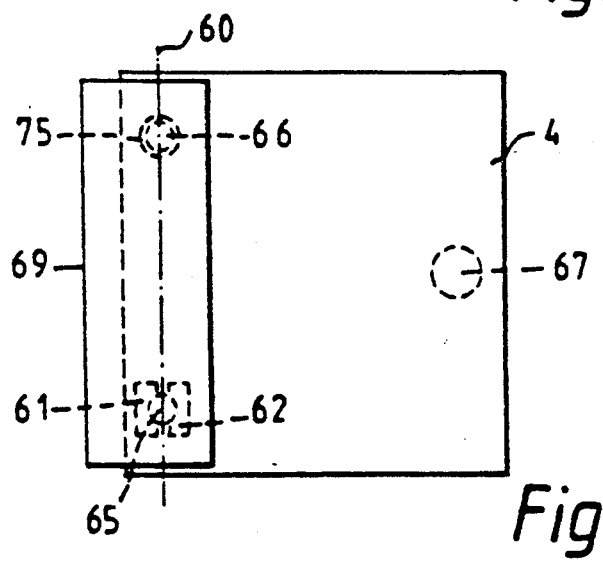
FIG. 8 is a plan view of a modified form of the invention of FIG. 6.
Figure 9:
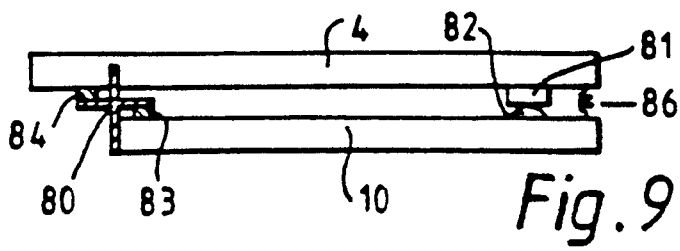
FIG. 9 is a part sectional elevation of a further alternative embodiment of the invention.

An alternative arrangement may be provided in which one of the vee grooves on axis 60 is replaced by an axisymmetric recess 75 (see FIG. 8) which will provide additional lateral constraint in the direction of the tilting axis so that the planar spring may be dispensed with. Thus in the FIG. 8 embodiment the constraining means is all built into the design of the hinge means. The C-spring is however retained to ensure that the balls do not lift out of the vee-groove and recess so that only relative pivoting movement takes place between the plates.

Alternative arrangements of the plates and springs may be utilised as shown in other known probes which use the hinge arrangement. For example, the tilting axes need not be arranged alternately at 90 degrees to each other as shown in FIG. 5. All that is required in a square plate arrangement is that two of the hinges define tilting axes which are parallel to one co-ordinate direction x and lie respectively on opposite sides of the probe axis, and the other two define tilting axes which are parallel to the orthogonal co-ordinate direction y and also lie respectively on opposite sides of the probe axis.

The plates may also be shaped such that the axes are all positioned in the same plane as is described for example in U.S. Pat. No. 4,535,543.

In another embodiment of the invention (not shown) a stack of four triangular shaped plates may be used in which case the pivot axes will be inclined to each other at angles other than right angles.

I claim:

1. A probe for use with measuring apparatus, the probe having an axis and comprising:
    a fixed member, a movable member to which a stylus is connectable, and at least one further intermediate member, all of the members having side edges and being spaced apart in the direction of the probe axis with their respective side edges being parallel,
    a leaf spring interconnecting each adjacent pair of members along parallel side edges thereof and acting as a hinge to provide a pivot axis at right angles to the probe axis and laterally offset therefrom to enable relative pivoting movement to take place between the members,
    support means for each pair of members disposed in the plane of the pivot axis of the pair on the opposite side of said probe axis to the pivot axis, said support means co-operating with the respective leaf spring to define an axial rest position for one member of the pair on the other when no external force acts on the probe stylus,
    resilient means for urging said one member of the pair into said rest position on the other member, and
    a planar spring interconnecting the two members of a pair for providing constraint against relative transverse movement therebetween.

2. A probe is claimed in claim 1 and in which the hinge means comprises means defining a pivot axis in combination with means for preventing axial separation of the two members of a respective pair at the pivot axis.

3. A probe as claimed in claim 2 and in which the hinge means comprises a pair of transversely separated aligned vee-grooves on one of the members and which co-operate with rolling elements on the other member to define a pivot axis for pivoting of one member of the pair on the other member, together with a spring for preventing axial separation of the two members at the pivot axis.

4. A probe as claimed in claim 2 and in which the hinge means comprises a vee-groove and an axisymmetric recess on one of the members which are transversely separated and wherein the centre of the recess is aligned with the axis of the vee-groove, said vee-groove and recess co-operating with rolling elements on the other member to define the pivot axis, together with a spring for preventing axial separation of the two members at the pivot axis.

5. A probe as claimed in claim 1 and in which the support means comprises simple abutments one on each of the two members and which abut in the plane of the pivot axis.

6. A probe as claimed in claim 1 and in which the support means is combined at least in part with the constraining means.

7. A probe as claimed in claim 1 and in which the hinge means is combined at least in part with the constraining means.

8. A probe for use with measuring apparatus, the probe having an axis and comprising:
    a fixed member, a movable member to which a stylus is connectable, and at least one further intermediate member, all of the members having side edges and being spaced apart in the direction of the probe axis with their respective side edges parallel,
    hinge means connecting the members together in pairs and constraining the members of each pair for relative pivoting movement about a pivot axis which extends in a plane at right angles to said probe axis, the pivot axis of each pair being laterally offset from said probe axis,
    support means for each pair of members disposed in the plane of the pivot axis of the pair on the opposite side of said probe axis to the pivot axis, said support means co-operating with the respective hinge means to define an axial rest position for one member of the pair on the other when no external force acts on the probe stylus,
    resilient means for urging said one member of the pair into said rest position on the other member, and
    a planar spring interconnecting the two members of a pair so as to prevent relative transverse movement therebetween.

9. A probe as claimed in claim 8 and in which the hinge means comprises a leaf spring interconnecting a respective pair of members along parallel side edges thereof.

10. A probe for use with measuring apparatus, the probe having an axis and comprising:
    a fixed member, a movable member to which a stylus is connectable, and at least one further intermediate member, all of the members having side edges and being spaced apart in the direction of the probe axis with their respective side edges parallel,
    a leaf spring interconnecting each adjacent pair of members along parallel side edges thereof and acting as a hinge to provide a pivot axis at right angles to the probe axis and laterally offset therefrom to enable relative pivoting movement to take place between the members,
    support means for each pair of members disposed in the plane of the pivot axis of the pair on the opposite side of said probe axis to the pivot axis, said support means co-operating with the respective leaf spring to define an axial rest position for one member of the pair on the other when external force acts on the probe stylus,
    resilient means for urging one member of the pair into said rest position on the other member, and
    constraining means for preventing relative transverse movements between the two members of a pair.

11. A probe as claimed in claim 10 and in which the constraining means is a planar spring disposed between and connected to each of the members and which lies generally in the plane of the pivot axis.

* * * * *